Inventor
CHARLES C. ROE
By Wolfe, Hubbard, Voit & Osann
Attorneys

Oct. 18, 1966                    C. C. ROE                    3,280,400
METHOD OF AND MEANS FOR CONTROLLING THE SPEED AND TORQUE
OF AN INDUCTION MOTOR
Filed Jan. 22, 1963                                            4 Sheets-Sheet 2
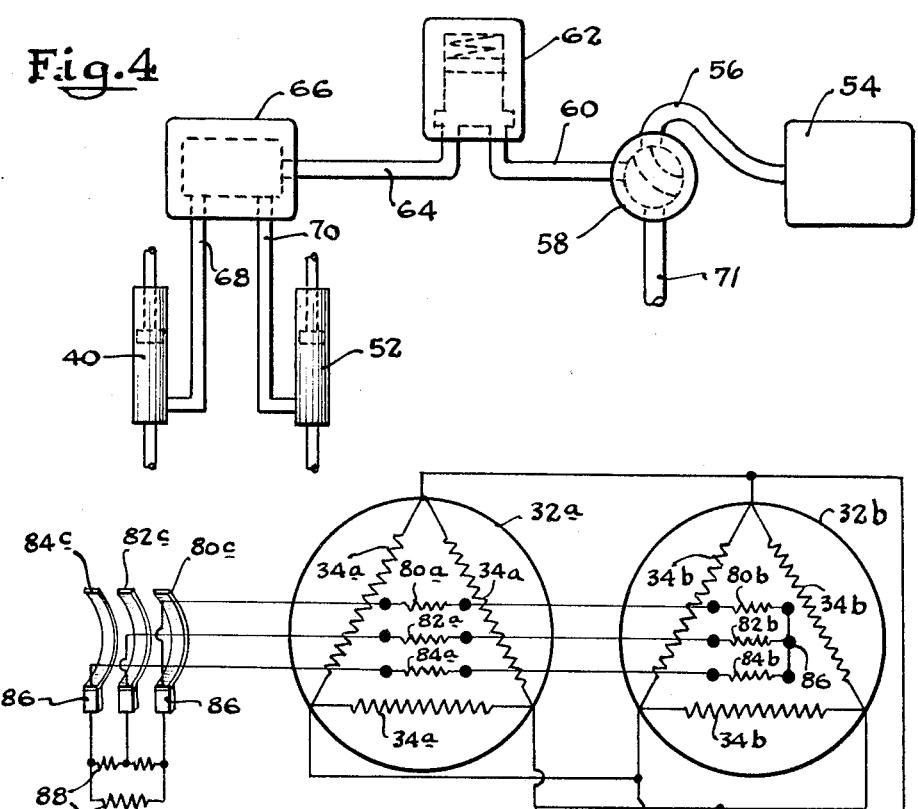
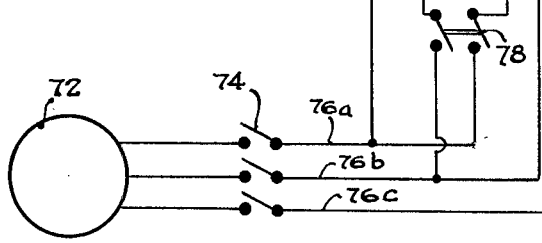
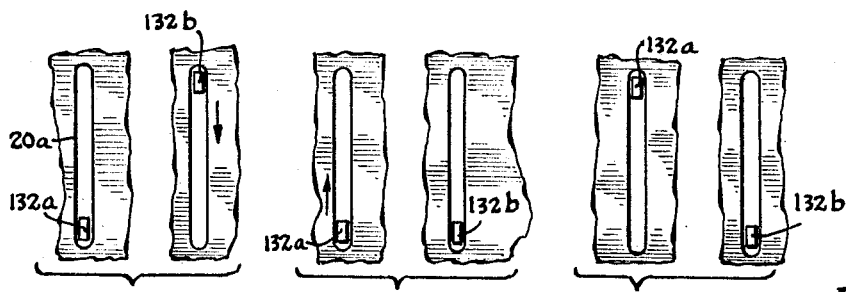
Inventor
CHARLES C. ROE
By Wolfe, Hubbard, Voit & Osann
Attorneys

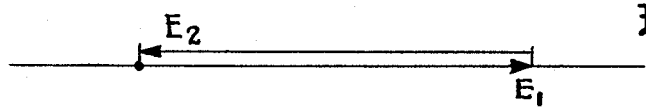
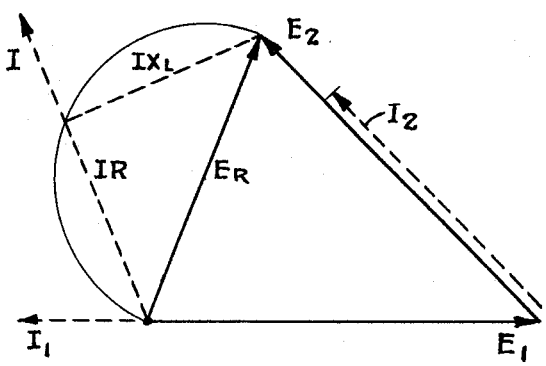
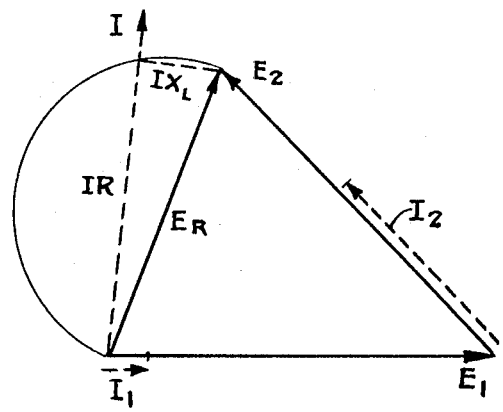
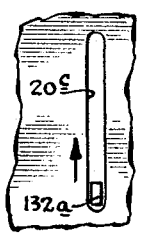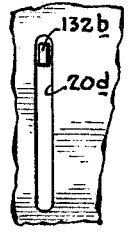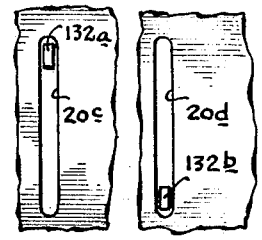

Oct. 18, 1966     C. C. ROE     3,280,400
METHOD OF AND MEANS FOR CONTROLLING THE SPEED AND TORQUE
OF AN INDUCTION MOTOR
Filed Jan. 22, 1963     4 Sheets-Sheet 4

Inventor
CHARLES C. ROE

By Wolfe, Hubbard, Voit & Osann
Attorneys

United States Patent Office 3,280,400
Patented Oct. 18, 1966

3,280,400
METHOD OF AND MEANS FOR CONTROLLING THE SPEED AND TORQUE OF AN INDUCTION MOTOR
Charles C. Roe, Rockford, Ill., assignor, by mesne assignments, of one-half to Herschel H. Stilley, Rockton, Ill.; one-sixth to Edith Roe, Longview, Tex.; one-fifteenth to Lucille Jones, Santa Barbara, Calif.; one-fifteenth to Dorothy Wilcock, Henderson, Nev.; one-fifteenth to Donald Roe, Salt Lake City, Utah; one-fifteenth to Betty Lou Butler, Modesto, Calif.; and one-fifteenth to Frieda Lipps, Los Angeles, Calif.
Filed Jan. 22, 1963, Ser. No. 253,164
10 Claims. (Cl. 318—243)

The present invention relates to an improved method of and means for controlling the speed and torque of an induction motor.

Alternating current induction motors are highly efficient and practical devices that have found wide use. They are, however, subject to the disadvantage that their inherent mode of operation gives rise to torque-speed characteristics that cannot readily be varied beyond a limited range of possible characteristics and, in many instances, may not be varied at all once the motor is constructed. While electrical variation of the torque-speed characteristic may be attained through the use of variable rotor resistance, cocatenation, and other schemes, these have not found general use because of the electrical complications they entail, including the need for switches capable of changing under load. Mechanical devices capable of varying the torque-speed characteristic entail loss of energy, considerable expense, waste of space, and introduce all the elements of unreliability and wear that are inherent in moving parts. These disadvantages are especially severe in the case of motors for rugged applications, such as off-the-road vehicles and the like.

In accordance with the present invention an improved controllable induction motor is provided without electrical switching elements or other electrical complications. No mechanical load-carrying control apparatus is required, and yet the torque-speed characteristic of the motor may be varied while under load and with highly simple apparatus. Briefly, in accordance with the present invention, the stator of the motor is divided into two independently wound relatively rotatable portions, each of which is rotatable 90 electrical degrees from neutral position. In the neutral position, the rotating magnetic fields associated with energization of the rotors are of equal intensity and 180 electrical degrees apart. In consequence, no induced voltage occurs in the rotor under this condition and the motor torque is zero. One stator is rockable in one direction of rotation from the neutral position. The other is rockable in the opposite direction of rotation. The respective stators are moved independently of each other and in the torque-increasing direction (that is, in the direction to bring the rotating magnetic fields to the in-phase additive relation producing maximum rotor torque).

The motor of the present invention takes advantage of the surprising fact that the reaction torque of the two stators is not equal but in fact is quite unequal. Consequently, the lightly loaded stator may be initially moved from the neutral to the maximum torque position under progressively increased turning moment even though this movement is in the same direction as positive stator reaction torque and would seem to be impelled by the load torque taken up by that stator. During this time the other stator remains stationary because of reaction torque resulting from its greater share of the total motor torque. Following this movement, the initially more heavily loaded stator may be rotated in the torque-increasing direction by application of still greater and progressively increasing turning moment, during which time the reaction torques of the two rotors become progressively more nearly equal until at the maximum rotation position the reaction torques are substantially equal.

This action provides an inherent unloading characteristic insofar as the control mechanism is concerned. A like moment may be applied to the stators in unison, and in direction to increase the electrical angle between the rotating magnetic fields, and hence the motor torque. If motor speed is maintained constant during this time, the driving torque progressively increases. If the torque applied to the stator parts is maintained constant during this time, the speed varies in response to load changes and the motor tends to produce constant output torque.

As set forth in further detail hereinafter, it is not known entirely why the surprising varying inequality in reaction torque distribution takes place as between the two essentially identical stator units. It is believed, however, to be due primarily to the inductance component of rotor impedance. In this respect, the present invention takes advantage of the inherent inductive rotor reactance to provide a surprising and desirable operation.

It is therefore a general object and advantage of the present invention to provide an improved alternating current induction motor with a controllable speed-torque characteristic and method of operating an induction motor to produce controlled torque output.

A further object of the present invention is to provide an improved alternating current induction motor and method of induction motor operation in which advantage is taken of the unlike torque reactions of a pair of like rotatable stators to provide a controllable speed-torque characteristic.

Still another object and advantage of the present invention is to provide an improved motor of the foregoing type and method of operating the same, in which progressive increases in control moment provide progressively increasing motor torque or speed.

Yet another object and advantage of the present invention is to utilize a highly simple, reliable, and inexpensive control mechanism for rotating two like induction motor stators in sequence to provide a controllable speed-torque characteristic.

A more specific object and advantage of the present invention is to provide an improved induction motor with a controllable torque-speed characteristic and in which the required control movement is effected through the medium of a fluid control system wherein the fluid control pressure is a direct measure of the motor output torque and speed.

Yet another specific object and advantage of the present invention is to provide an induction motor and method of operating the same of the foregoing type that may be operated in either direction of rotation under the same control system and with the same control characteristics.

Still another specific object and advantage of the present invention is to provide an induction motor of the foregoing type and method of operating the same wherein the unit will serve as a dynamic brake in overspeed generator action under the control of the operator and utilizing the same control mechanism as is required for a normal motor operation.

Further it is an object and advantage of the present invention to provide an improved induction motor and method of operation thereof having a controllable torque-speed characteristic which requires no electrical switching mechanism for control, does not demand electrical or mechanical variable or slip control elements carrying the motor output energy, and uses highly simple, effective, and reliable movable (but not necessarily rotatable) control elements that make the motor especially suitable for applications where conditions of rough use, dust, inaccessibility, demand a highly simple, reliable, and nevertheless effective control.

The novel features which I believe to be characteristic of my invention are set forth with particularity in the appended claims. My invention itself, however, both as to the structure employed and as to the steps of the method, together with further objects and advantages thereof, will best be understood by reference to the following description taken in connection with the accompanying drawings, in which:

FIGURE 1, with parts in plan;

FIGURE 4 is a diagram of one form of hydraulic control mechanism for use with the motor of FIGURES 1-3;

FIGURE 5 is a diagram of one form of electrical circuit for use with the motor of FIGURES 1-3;

FIGURE 6 is a diagram in vector form illustrating the motor electrical conditions when the stator parts are in neutral position;

FIGURES 7 and 8 are diagrams in vector form illustrating the motor electrical conditions when the stator parts are positioned 45 electrical degrees relation to each other from the neutral position, the diagrams being applicable, to low power factor and high power factor operation, respectively;

Figure 9:
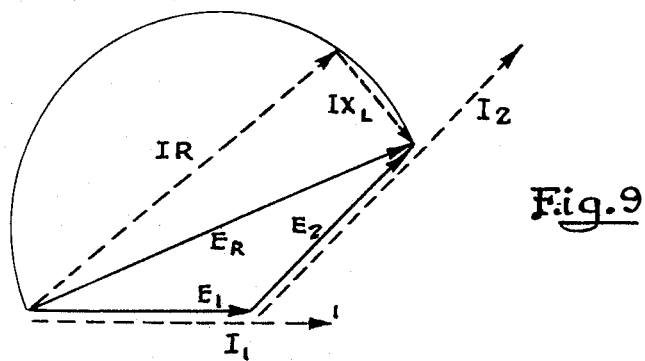
Figure 10:
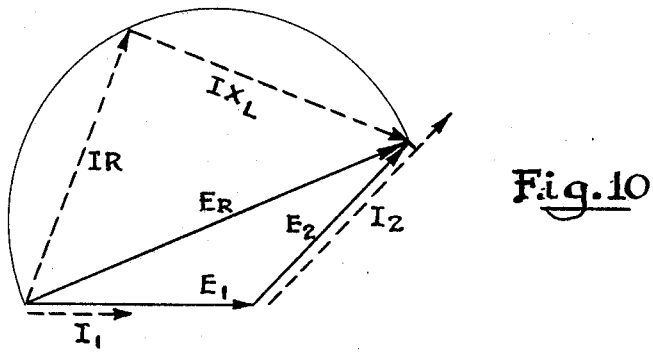
Figure 11:
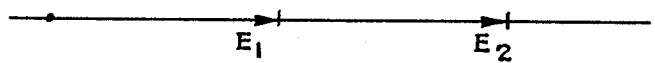

FIGURES 9 and 10 are diagrams in vector form similar to FIGURES 7 and 8, respectively, but showing the stator parts positioned 135 electrical degrees in relation to each other from the neutral position, the diagrams being applicable to low power factor and high power factor operation, respectively;

FIGURE 11 is a diagram in vector form of the motor electrical conditions when the stator parts are moved from the neutral position to the position of the maximum supporting relation to each other;

FIGURES 12a, 12b, and 12c are three illustrative diagrams showing the positions of the stator parts for progressively increased torque positions when the motor is poled to exert torque in one direction; and FIGURES 13a, 13b, and 13c are similar illustrative diagrams for the energization of the motor to exert torque in the opposite direction.

THE MOTOR CONSTRUCTION

Figure 1:
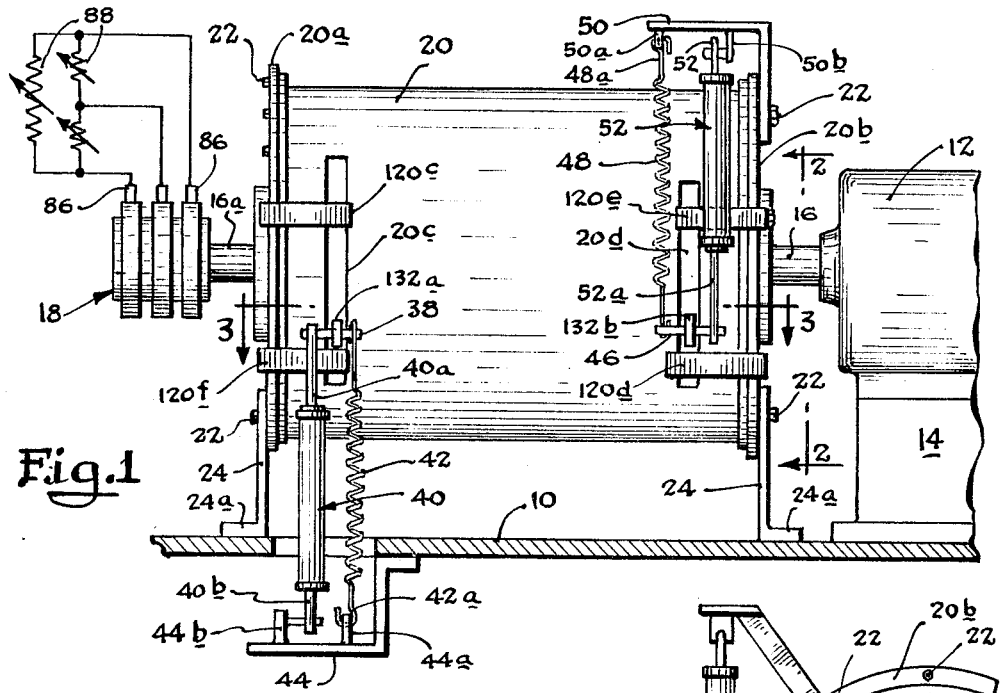
FIGURE 1 is a somewhat diagrammatic view in side elevation of a motor and control mechanism constructed in accordance with one form of the present invention.
Figure 2:
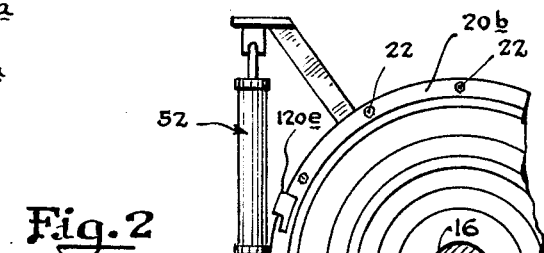
FIGURE 2 is a fragmentary and somewhat diagrammatic view through section 2—2, FIGURE 1.
Figure 3:
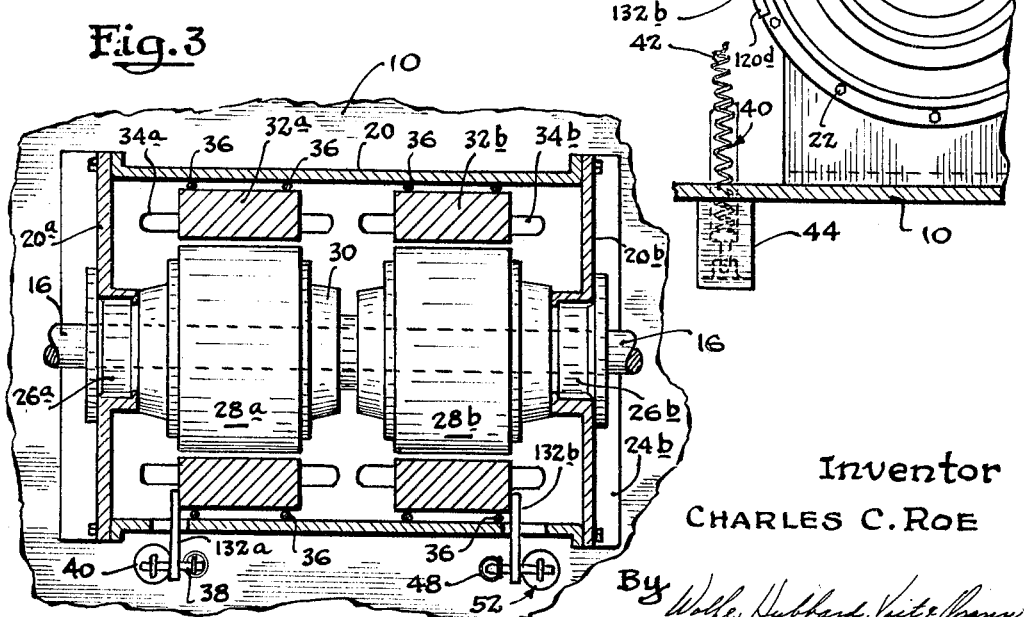
FIGURE 3 is a view in cross-section through axis 3—3.

The construction of the motor is shown in somewhat diagrammatic form in FIGURES 1, 2 and 3. As there shown, the motor is supported by a base plate 10 which is supported in horizontal position by suitable means (not shown). A driven unit shown diagrammatically at 12 (which may, for example, be a dynamometer in testing or the driven wheel of a vehicle in application of the motor to a vehicle drive) and is supported on the base plate 10 by the stand 14. The motor shaft which extends through the motor proper and drives the unit 12, is indicated at 16. At its free end 16a, this shaft carries the slip rings indicated generally at 18 as hereinafter described.

The motor proper is defined by the cylindrical support unit or frame 20 which has end plates 20a and 20b, FIGURE 3, attached by bolts 22 as shown. The frame is supported from the base plate 10 by the upstanding plates 24 which are respectively affixed to the end plates 20a and 20b through the medium of some of the bolts 22 and have outturned feet 24a which are attached to the bed plate 10 by bolts, welding, or other suitable means, to sustain the motor frame 20 in desired position.

Each of the end plates 20a and 20b receives a bearing, indicated at 26a and 26b, respectively, FIGURE 3. The bearings, respectively, receive the shaft 16 to support the same and the rotor. The rotor unit is further defined by a pair of spaced induction motor magnetic rotor cores 28a and 28b, respectively, FIGURE 3, which are held in predetermined spaced position by the spacer unit 30, FIGURE 3. These each receive an induction motor torque creating winding as hereinafter described.

The stator of the motor is in two-part form defined by the two magnetic stator cores 32a and 32b, respectively, FIGURE 3. As shown in that figure, these are respectively telescoped over the rotor core parts 28a and 28b, so that the rotating magnetic fields they generate thread the rotor core parts, respectively. Each of these stator cores receives an induction motor stator winding 34a and 34b, respectively. The organization and construction of these stator windings is described in further detail hereafter.

The stator cores 32a and 32b are each rockably supported within the housing 20. This is accomplished through any suitable bearing means. For purposes of illustration, the respective units are shown so carried by means of balls 36 which ride in mating annular outer grooves on the outside of the stator cores and the inside of frame 20, thereby permitting rocking movement of each stator independently of the other and under the control of the mechanical elements as hereinafter described.

The housing 20 has a pair of partially circumferential slots 20c and 20d, FIGURE 1. Each of these extends circumferentially at least 90 electrical degrees with respect to each stator part. The slot 20c receives the generally radial arm 132a which is affixed by welding or otherwise to the outboard face of the stator 32a as shown in FIGURE 3. The slot 20d receives a similar arm 132b which is affixed by welding or otherwise to the outboard face of the stator 32b, as shown. As hereinafter described, these arms permit the application of rocking torque to the stators, respectively, for positioning of the respective stators and control over the electrical phase relation between the voltages they induce in the rotor windings (and hence the motor output torque).

The outboard end of the arm 132a receives a pin 38 which extends through and outboard each face of the arm 132a. On the left hand side as seen in FIGURES 1 and 3, this pin receives the end of the arm 40a of the hydraulic motor indicated generally at 40. At the other end, this pin receives one end of the helical tension spring 42. At its lower end 42a, the spring 42 is received in and held by the upstanding arm 44a of the support bracket 44 held on the underside of the bed plate 10 by welding or other suitable means. The lower arm 40b of the motor 40 is similarly held by the upstanding post 44b of the bracket 44.

The unit 40 is a hydraulic motor in the form of a cylinder and piston unit. It may be one of many constructions well known in the art wherein the application of hydraulic pressure fluid under increased pressure exerts a force tending to drive the arms 40b and 40a to increased linear spacings along their common axis. Thus as the hydraulic pressure to which the unit 40 is subjected is increased, the arm 132a is biased upwardly against the tension of spring 42 in increasing amounts. As hereafter described in detail, this produces a torque on the stator core 32a tending to rotate the same in the clockwise direction as seen in FIGURE 2, the amount of the torque being dependent upon the applied fluid pressure. This torque is balanced under steady state operating conditions by the reaction torque on the stator 32a resulting from the drive torque of that stator, or by the reaction against stop 120c when the arm 132c is in maximum clockwise position.

The outboard end of the arm 132b similarly receives a pin 46 which extends through that arm and has portions outboard each side thereof. The left hand portion of the pin 46 receives the tension coil spring 48, which at upper end 48a is received by and sustained by the depending post 50a of the bracket 50. Bracket 50 is affixed to and held by the end plate 20b through the medium of bolts 22, as shown in FIGURE 1. The opposite or right hand end of the pin 46 (as seen in FIGURE 1) receives the arm 52a of the hydraulic motor unit 52. The other arm 52b of this unit is received and sustained by the depending post 50b of the bracket 50.

The hydraulic motors 40 and 52 are subjected to fluid under pressure by a mechanism of the type shown generally for illustrative purposes at FIGURE 4. The hydraulic fluid is maintained under pressure in the source 54. From that source it travels through the pipe or hose 56 to the 3-way valve control unit 58, which may be of the type having a rotatable rotor defining a fluid connection as shown diagrammatically in FIGURE 4. This valve unit is normally held under suitable spring or other action in the neutral position. It can be shifted manually or otherwise to a pressure-increasing position wherein the pipe or hose 60 is connected to source 54. Pipe 60 is connected to control chamber unit 62. The latter unit provides a chamber of varying capacity in accordance with fluid pressure, so that as increasing quantities of fluid are applied to the system the pressure within the system is increased. As shown diagrammatically in FIGURE 4, it may use a spring-biased piston for this purpose. The unit 62 is connected through the pipes or hoses 68 and 70 which are connected, respectively, to the hydraulic motors 40 and 52. Header 66, as shown diagrammatically, defines fluid passages between these parts.

The valve 58 is movable to a third operating position under manual or other action to connect the pipe or hose 60 to a dump pipe or hose 71. When the valve is so positioned, the fluid in unit 62 can discharge, the volume of fluid in the system is thereby reduced, and the pressure within the system is decreased. The force exerted by the fluid motors 40 and 52 (and hence the torque on the respective stator parts 32a and 32b) is accordingly reduced.

The fluid control mechanism shown in FIGURE 4 is for illustrative purposes to indicate one mechanism by which the hydraulic motors 40 and 52 may be subjected to controllable like fluid pressures. Other arrangements for providing fluid at controllable pressure may, of course, be utilized.

The stator units 32a and 32b receive, respectively, the stator windings 34a and 34b, FIGURE 3, as above described. These windings are induction motor stator windings and may be of conventional type. Each winding is like the other with respect to number of poles and ability to produce a magnetic field of predetermined intensity when subjected to the same conditions of applied voltage. The connections of these windings are shown diagrammatically in FIGURE 5. As shown, a source of polyphase voltage, shown for convenience as a three-phase source, indicated at 72 is connected by the disconnect switch 74 to the three-phase conductors 76a, 76b, and 76c leading to the three terminals of the respective stator windings. The conductors are so arranged that with the voltage as applied from the source 72 the rotating fields produced by the stator windings are in like directions of rotation and, as above indicated, have like numbers of poles and like magnetic flux values. A reversing switch 78 is interposed in the connections of the lines 76a and 76b to permit reversal of these connections and thereby reverse the directions of the rotating magnetic fields, thereby reversing the direction of motor torque.

The windings on the rotor units 28a and 28b are shown in diagrammatic form in FIGURE 5. These windings are shown in three-part form, that is defined by loops extending respectively about the faces of the rotors and located at 120-degree spacings in relation to each other so as to have induced voltages in three-phase relation in accord with the slip between the rotating magnetic fields and the actual rotor rotation. These windings are indicated at 80a, 80b, 82a, 82b, 84a, and 84b, FIGURE 5. In the rotor 28b the windings are connected to a common neutral point 86. From this neutral point a circuit may be traced from each winding 80b, 82b and 84b, through the correspondingly positioned winding 80a, 82a, and 84a, to the corresponding slip ring 80c, 82c and 84c. The slip rings receive brushes 86 and are connected to the delta-connected rotor resistors 88 as shown in FIGURES 1 and 5 as in normal wound-rotor induction motor practice. These may be variable resistors to provide a selection of motor torque-speed characteristics.

If desired, the rotor unit and electrical connections above described may be replaced by an elongated squirrel cage rotor unit wherein the two rotor parts 28a and 28b are defined by either a continuous or split core and the squirrel cage winding bars extend continuously from the outboard face of the core portion 28b to the outboard face of the core portion 28a. Other forms of the rotor construction wherein the effective rotor induced voltage is the vector sum of the induced voltages of the respective parts may be used.

Springs 42 and 43 serve to hold the arms 132a and 132b against stops 120f and 120e. In these positions, the stators 32a and 32b produce equal and opposing rotating magnetic fields. Stop 120c limits the rocking movement of arm 132a and stator 32a to 90 electrical degrees in the clockwise direction of FIGURE 2. Stop 120d similarly limits rocking movement of arm 132b and stator 32b to 90 electrical degrees counterclockwise of FIGURE 2.

PRACTICAL OPERATION

In explaining the practical operation of the present invention it is helpful to consider the diagrams constituting FIGURES 12a, 12b, and 12c. These represent in diagrammatic form the positions of the respective arms 132a and 132b as the motor is changed from a no-torque condition to an intermediate torque condition and, finally, to the maximum torque condition, all for the case of stator energization giving a counterclockwise rotation of the magnetic field as seen in FIGURE 2. Under the no-torque condition, FIGURE 12a, the arm 132a is in the down position and the arm 132b is in the up position. At this time the rotating magnetic fields of the two stators are equal and opposed to each other and give rise to no substantial induced voltage in the rotor (that is, no substantial voltage between the slip rings 80c, 82c, and 84c, FIGURE 5). There is accordingly no substantial rotor current and no substantial torque exerted.

As fluid under pressure is applied to the hydraulic motor units 40 and 52, FIGURE 1, in unison (through a fluid pressure control mechanism such as is described with reference to the diagram of FIGURE 4), the arm 132a first moves from its lower position of FIGURE 12a and ultimately reaches the upper position of FIGURE 12b. Since this movement is in the direction of the reaction torque on the stator 32a, FIGURE 3, it would seem that this action should occur spontaneously in response to reaction torque and without requiring the exertion of fluid under pressure. Contrary to this expected operation, however, the driving torque is unequally divided between the two stators. In particular under the conditions of FIGURES 12a and 12b the stator 32a does not exert its share of the drive torque. The arm 132a accordingly does not spontaneously move to the up position but instead is moved by the hydraulic motor 40 and does so under the control of that motor. The arm 132a thus progressively moves from the position of FIGURES 12a to the position of 12b under the control of the applied fluid, and the reaction torque on stator 32a has little influence on the operation.

Further application of fluid under pressure to the hydraulic motors 40 and 52, results in no further movement of the arm 132a because the stop surfaces defined by the upper end of the slot 20c (which may, alternatively, be a separate stop plate as shown at 120c, FIGURE 1) arrest such movement. This stop surface is so located that the movement of the arm 132c is a total of 90 electrical degrees, so that the phase of the voltage induced by the rotating magnetic field of the stator 32a is rotated to 90 degrees clockwise as seen in FIGURE 2 when arm 132a moves from the position of FIGURE 12a to that of FIGURE 12b. As hereinafter described, this shifts the voltage induced by stator 32a in the rotor from opposition to that of stator 32b to a 90 degree phase relation therewith.

Such further application of fluid under pressure to the hydraulic motors 40 and 52 rocks the arm 132b against the torque reaction of stator 32b and in the down direction as seen in FIGURES 12b and 12c. The arm 132b is ultimately rocked to the down position of FIGURE 12c, which is 90 electrical degrees from its initial position (FIGURE 12b). In the final position of FIGURE 12c, the voltage induced in the rotor by the stator 32b is in phase additive relation to the voltage induced by the stator 32a, and maximum motor torque is developed. Arm 132b is held against movement beyond this position by the stop defined by slot 20d, as in FIGURES 12a to 12c, or by a separate stop 120d, FIGURE 1, suitably affixed to end plate 20b.

Through the sequential action above described, the torque developed by the motor is increased progressively and in accord with the fluid pressure applied to the hydraulic motors 40 and 52. Alternatively, if the torque load on the motor increases the reaction torques on the respective stators 32b and 32a cause one or the other of them to rock against the moment of the applied fluid pressure (arm 132b moving if it has been previously moved downwardly from its up position shown in FIGURE 12b, and arm 132a moving if arm 132b is still in its up position) until the torque is reduced to that associated with the particular fluid pressure applied. During such action the speed of the motor decreases thus providing unloading action (due to load torque-speed characteristics) that brings down the load torque to the value required for equilibrium. Should the load torque decrease, the opposite action takes place to increase the motor speed until the load and drive torques are again balanced.

Applicant is not certain why the surprising action above described takes place. It is thought that at least in a qualitative way the action may be explained by the vector relationships shown in FIGURES 6 to 11, inclusive. In FIGURE 6, the initial condition of FIGURE 12a is shown. The induced rotor voltage $E_1$ of the stator 32a is in direct opposition to that of the voltage $E_2$ of the stator 32b, giving rise to no substantial net rotor voltage, no substantial rotor current flow, and no substantial torque.

When the arm 132a has moved half way up from the position of FIGURE 12a to that of FIGURE 12b, the voltage $E_1$ has a 45 degree phase relation with that of voltage $E_2$. Assuming relatively low rotor power factor, the phase relations are approximately as shown in FIGURE 7. The resultant voltage in the rotor is as shown at $E_R$ and the current in the rotor is shown as I, this current producing a power or resistive voltage IR and a reactive voltage $IX_L$ which add vectorially to equal the voltage $E_R$. It will be observed that the current I is more nearly in phase with the voltage $E_2$ (the voltage of the stator 32b) than it is with the voltage $E_1$ (the voltage of the stator 32a). Consequently the in-phase component of rotor current on the stator 32b (indicated at $I_2$) is much greater than the in-phase component of rotor current with respect to the voltage $E_1$ (indicated at $I_1$). Indeed, under the conditions shown, the phase relation is such that the component $I_1$ is in opposition to the voltage $E_1$ (indicating that at least in theory there should be some generator action in the stator 32a).

From the foregoing analysis it will be seen that the action under the conditions of FIGURE 7 is one wherein the stator 32b exerts a greater driving torque than the stator 32a and, that the latter may actually be taking energy from the rotor and feeding it back to the stator circuitry by generator action. It would follow that the arm 132a, FIGURES 12a and 12b will move under the control of the hydraulic motor 40 as above described with respect to these figures.

When the stator 32a has completed its movement to the 90 degree position in relation to its initial position, then the stator 32b moves as is described above. When the latter has moved half-way from the position of FIGURE 12b to that of 12c, the voltage induced in the rotor by the stator 32b is 135 degrees in advance of the voltage induced by the rotor 32a. The two induced voltages then add substantially as shown in FIGURE 9. At relatively high power factor operation, the rotor current component in phase with the voltage $E_2$ (current component $I_2$) is larger than that in phase with the voltage $E_1$ (current component $I_1$). At this time, therefore, the stator 32b is still carrying more than its share of the load. As shown in FIGURE 10, this is also true when the power factor is low under these conditions. It accordingly requires progressively greater fluid pressure to rock the stator 32b to produce greater torque, and the increased pressure-increased torque characteristic is maintained.

Further rotation of the stator 32b to the position of FIGURE 12c, however, brings the voltages $E_1$ and $E_2$ to the additive, in-phase, relation shown in FIGURE 11. Since the two voltages are now in phase, the component of rotor current flow in phase with each is the same and they divide the load equally.

Experiments show that with the apparatus operating through the sequence of events shown in FIGURES 12a, 12b and 12c, the proportion of the load carried by the stator 32b is greater than that carried by stator 32a, until the maximum torque position is reached, at which time the load is shared equally. While applicant does not desire to be bound by any particular explanation for this phenomena, it is believed to be due to the action set forth above with reference to FIGURES 6 to 11 inclusive.

When the switch 78, FIGURE 5 is changed from one position to the other, the direction of the rotating magnetic fields created by the respective stators is reversed. If this switch is set to provide rotating magnetic fields in the clockwise direction as seen in FIGURE 2, the sequence of events as fluid is applied to motors 40 and 52 is as shown in FIGURES 13a, 13b, and 13c. As shown, the arm 132b first moves down, bringing the stator 32b to a 90 degree rocking movement in relation to the zero-torque position. This operation results because under these conditions the stator 32b is carrying less than its share of the total load and is movable under the control of the hydraulic motor 52. Ultimately the condition of FIGURE 13b is reached, where the 90 degree position of the rotor 32b has been reached. Further application of fluid under pressure then moves the arm 132a (and the stator 32a) against the reaction torque to progressively greater advanced positions in relation to stator 32b. This brings the voltages progressively into the additive, in-phase, position that creates maximum motor torque.

The motor of the present invention also operates as a generator or brake under the control of the applied hydraulic fluid. When the speed of shaft 16, FIGURE 3, exceeds the synchronous speed, the direction of current flow in the stators is reversed and the direction of reaction torque also reverses. However, because there is again an unequal division of load between the two stator units, the control by way of the hydraulic units is still maintained and application of greater hydraulic fluid pressure increases the generator (braking) action and the application of less pressure decreases the generator (braking) action.

It will be observed that with the apparatus herein described one of the stators is initially rocked in the same direction as reaction torque and then the other is rocked against reaction torque. Because of the unequal division of the load stator rocked in the direction of reaction torque is not subjected to significant reaction torque during this time, so that control is achieved through the hydraulic system and there no tendency of the stator to rotate to progessively greater rotations in runaway action. Also, the rocking of the other stator against reaction torque requires progressively increased moment, so that throughout the operation range an increase in applied fluid pressure provides an increase in effective voltage on the rotor and an increase in rotor torque.

Applicant has used hydraulic motors to control the positions of the arms 132a and 132b and regards this control as the preferred form of the present invention. Other methods of applying controlled moment to the stators in unison, such as suitably energized rotating or non-rotating electric motors, may be used if desired. The spring constants of springs 42 and 48 are not critical. It has been found that effective operation is achieved when these are such as to restore the stators to the FIGURE 12a positions in prompt action. Since these springs work against the motors 40 and 52, they are preferably no stronger than necessary.

While I have shown and described a specific embodiment of the present invention, and have set forth what is believed to be the most plausible explanation for the action encountered, it will of course be understood that I do not wish to be limited to this specific embodiment or to the particular explanation set forth, and that by the appended claims I intend to cover all modifications and alternative constructions falling within their true spirit and scope.

What I claim as new and desire to secure by Letters Patent of the United States is:

1. An induction motor having torque variable at will comprising in combination: a rotor having an axis, a magnetic core on said axis and an induction torque-creating winding extending at least part of the axial length of said core; a pair of substantially identical stator units, each telescoping over a part of said axial length of the core and each, when energized, producing a rotating magnetic field of substantially the same intensity as the other, having like numbers of poles, and having a like direction of rotation; means supporting the stator units, respectively, said means permitting individual rocking of the stator units about said axis and in opposite directions from a neutral position where their magnetic fields are in aligned opposed spaced relation to a second position wherein their magnetic fields are in aligned reinforcing space relation, whereby with the stator units in said neutral position the effective rotating field as to said rotor is minimal and with stator units in said second position the effective rotating field as to said rotor is maximal; stop means effective to limit rocking of said stators, respectively, between said positions; means biasing said stator units, respectively, towards said neutral position; a pair of substantially identical fluid pressure operated motors effective upon application of fluid pressure to overcome said last means and to urge the stators towards said second position; and, means to apply fluid to said last motors in unison, whereby upon application of progressively increased fluid pressure one stator rocks in the direction opposite to rotor torque to its maximum torque position and thereafter the other stator rocks in direction of reaction torque to its maximum torque position.

2. An induction motor having torque variable at will comprising in combination: a rotor having an axis, a magnetic core on said axis and an induction torque-creating winding extending over at least part of the axial length of said core; a pair of substantially identical stator units, each telescoping over a part of said axial length of the core and each, when energized, producing a rotating magnetic field of substantially the same intensity as the other, having like numbers of poles, and having a like direction of rotation; means supporting the stator units, respectively, said means permitting individual rocking of the stator units about said axis and in opposite directions from a neutral position where their magnetic fields are in aligned opposed space relation to a second position wherein their magnetic fields are in aligned reinforcing space relation, whereby with the stator units in said neutral position the effective rotating field as to said rotor is minimal and with said stator units in said second position the effective rotating field as to said rotor is maximal; means biasing said stator units, respectively, towards said neutral position; a pair of substantially identical fluid pressure operated motors effective upon application of fluid pressure to overcome said last means and to urge the stators towards said second position; and, means to apply fluid to said last motors in unison, whereby upon application of progressively increased fluid pressure one stator rocks in the direction of normal reaction torque to its maximum torque position and thereafter the other stator rocks in the direction of reaction torque to its maximum torque position.

3. An induction motor having torque variable at will comprising in combination: a rotor having an axis, a magnetic core on said axis and an induction torque-creating winding extending over at least part of the axial length of said core; a pair of substantially identical stator units, each telescoping over a part of said axial length of the core and each, when energized, producing a rotating magnetic field of substantially the same intensity as the other, having like numbers of poles, and having a like direction of rotation; means supporting the stator units, respectively, said means permitting individual rocking of the stator units about said axis and in opposite directions from a neutral position where their magnetic fields are in aligned opposed space relation to a second position wherein their magnetic fields are in aligned reinforcing space relation, whereby with the stator units in said neutral position the effective rotating field as to said rotor is minimal and with said stator units in said second position the effective rotating field as to said rotor is maximal; means biasing said stator units, respectively, towards said neutral position; and means to apply a controllable force in unison to said stators and in opposition to said last means, whereby upon the application of such force in increased amounts one stator rocks in the direction of normal reaction torque to its maximum torque position and thereafter the other stator rocks in direction of reaction torque to its position of maximum torque.

4. An induction motor having torque variable at will comprising in combination: a rotor having an axis, a magnetic core on said axis, and an induction torque-creating winding extending over at least part of the axial length of said core; a pair of substantially identical stator units, each telescoping over a part of said axial length of the core of the rotor and each, when energized, producing a rotating magnetic field of substantially the same intensity as the other, having like numbers of poles, and having a like direction of rotation; means supporting the stator units, respectively, said means permitting individual rocking of the stator units about said axis and in opposite directions from a neutral position where their magnetic fields are in aligned opposed space relation to a second position wherein their magnetic fields are in aligned reinforcing space relation, whereby with the stator units in said neutral position the effective rotating field as to said rotor is minimal and with said stator units in said second position the effective rotating field as to the said rotor is maximal; and, means to apply a controllable force in unison to said stators and in opposition to said last means, whereby upon application of said force in increased amounts one stator rocks in the direction of normal reaction torque to its maximum torque position and thereafter the other stator rocks in the direction of reaction torque to its position of maximum torque.

5. A mechanism for use in conjunction with controllable force-applying means to provide induction motor operation having torque variable at will, said mechanism including in combination: a motor frame; a rotor supported in said frame for rotations about a predetermined axis, said rotor including a magnetic core cylindrical about said axis and an induction torque-creating winding extending over the axial length of said core; a pair of substantially identical stator units, each telescoping over a part of said axial length of the core and each, when energized, producing a rotating magnetic field of substantially the same intensity as the other, having like numbers of poles, and having a like direction of rotation; and, means supporting the stator units, respectively, said means permitting individual rocking of the stator units about said axis and in opposite direction from a neutral position where their magnetic fields are in aligned opposed space relation to a second position wherein their magnetic fields are in aligned reinforcing space relation, said last means and said frame coacting to define stop elements effective as to said stator units, respectively, to limit rocking movements thereof to said respective positions.

6. A mechanism for use in conjunction with controllable force-applying means to provide induction motor operation having torque variable at will, said mechanism including in combination: a motor frame; a rotor supported in said frame for rotations about a predetermined axis, said rotor including a magnetic core cylindrical about said axis and having two axially spaced like parts, and an induction torque-creating winding having two like parts extending over said parts of said core, respectively, the parts of said winding being electrically related to respond to the flux linking said two parts of the core; a pair of substantially identical stator units, each telescoping over one part of said core and each, when energized, producing a rotating magnetic field of substantially the same intensity as the other, having like numbers of poles, and having a like direction of rotation; and, means supporting the stator units, respectively, said means permitting individual rocking of the stator units about said axis and in opposite direction from a neutral position where their magnetic fields are in aligned opposed space relation to a second position wherein their magnetic fields are in aligned reinforcing space relation, said last means and said frame coacting to define stop elements effective as to said stator units, respectively, to limit rocking movements thereof to said respective positions.

7. A mechanism for use in conjunction with controllable force-applying means to provide induction motor operation having torque variable at will, said mechanism including in combination: a motor frame; a rotor supported in said frame for rotations about a predetermined axis, said rotor including a magnetic core cylindrical about said axis and having two axially extending like parts, and an induction torque-creating winding having two like parts extending over said parts of said core, respectively, the parts of said winding being electrically related to respond to the flux linking said two parts of the core; a pair of substantially identical stator units; each telescoping over one part of said core and each, when energized, producing a rotating magnetic field of substantially the same intensity as the other, having like numbers of poles, and having a like direction of rotation; and, means supporting the stator units, respectively, said means permitting individual rocking of the stator units about said axes and in opposite direction from a neutral position where their magnetic fields are in aligned opposed space relation to a second position wherein their magnetic fields are in aligned reinforcing space relation, said last means and said frame coacting to define stop elements effective as to said stator units, respectively, to limit rocking movements thereof to said respective positions.

8. In an induction motor, the combination comprising a frame, first and second stator assemblies on said frame having substantially identical windings for producing rotating fields, a rotor in said frame having a single set of windings in which voltages are induced by the stator fields, each of said stators being rotatably movable in said frame between a null phase relation in which the induced voltages are cancelled and an aligned phase relation in which the induced voltages are additive for production of maximum torque, and fluid control means coupled between said stator assemblies for rotatably moving the stator assemblies from said null phase relation to said aligned phase relation.

9. In an induction motor, the combination comprising a frame, first and second stator assemblies on said frame having substantially identical windings for producing rotating fields, a rotor in said frame having a single set of windings in which voltages are induced by the stator fields, each of said stators being mounted for rotational movement independently of the other stator whereby said stators can be rotatably moved between a null phase relation in which the induced voltages are cancelled and an aligned phase relation in which the induced voltages are additive for production of maximum torque, and means for applying a controllable force in unison to said stators whereby upon application of said force in increased amounts one stator moves in the direction of normal reaction torque to its maximum torque position and thereafter the other stator moves in the direction of reaction torque to its maximum torque position.

10. In an induction motor, the combination comprising a frame, first and second stator assemblies on said frame having separate windings for the production of separate rotating fields, a rotor rotatably mounted in said frame for cooperation with both of said stators and having a single set of windings in which voltages are induced by the stator fields, each of said stators being mounted for rotational movement independently of the other stator whereby said stators can be rotatably moved between a first position in which the induced voltages produce a minimum torque and a second position in which the induced voltages produce a maximum torque, and means for applying a controllable force in unison to said stators whereby upon application of said force in increased amounts one stator rotates from its position of minimum torque to its position of maximum torque and thereafter the other stator rotates from its position of minimum torque to its position of maximum torque.

References Cited by the Examiner
UNITED STATES PATENTS

| | | | |
|---|---|---|---|
| 2,524,361 | 10/1950 | Sawyer | 318—243 |
| 2,787,747 | 4/1957 | Drummond | 318—45 |
| 2,881,338 | 4/1959 | Banning | 318—243 |

ORIS L. RADER, *Primary Examiner.*

C. E. ROHRER, G. A. FRIEDBERG,
*Assistant Examiners.*